United States Patent [19]

Gaiani

[11] Patent Number: 4,569,241
[45] Date of Patent: Feb. 11, 1986

[54] BALL-TYPE SCREW/NUT SYSTEMS AND A PROCESS FOR PRODUCING THEM

[75] Inventor: Robert Gaiani, Figeac, France

[73] Assignee: Ratier-Figeac, France

[21] Appl. No.: 600,783

[22] Filed: Apr. 16, 1984

[30] Foreign Application Priority Data

Apr. 20, 1983 [FR] France .................. 83 06440

[51] Int. Cl.⁴ .................. F16H 1/00; B23P 11/00
[52] U.S. Cl. .................. 74/424.8 R; 29/434; 29/DIG. 48; 219/121 ED; 219/121 LD; 228/112; 403/343; 403/361; 464/182
[58] Field of Search ........... 29/407, 412, 417, 430, 29/434, DIG. 21, DIG. 48; 219/121 ED, 121 LD; 228/112, 113; 403/270, 271, 272, 343, 361; 464/178, 179, 182; 74/424.8 R, 424.8 A, 424.8 B, 424.8 C, 424.8 NA, 424.8 VA, 424.8 VZ

[56] References Cited

U.S. PATENT DOCUMENTS

| | | | |
|---|---|---|---|
| 1,064,764 | 6/1913 | Parker | 403/270 X |
| 2,944,436 | 7/1960 | Pickles | 74/424.8 R |
| 3,849,850 | 11/1974 | Goutard | 29/430 X |
| 3,949,186 | 4/1976 | Nayakama et al. | 219/121 ED |
| 4,121,532 | 10/1978 | Goryell, III | 464/182 X |
| 4,232,562 | 11/1980 | Perkins | 74/424.8 R |

*Primary Examiner*—Howard N. Goldberg
*Assistant Examiner*—Ronald S. Wallace
*Attorney, Agent, or Firm*—Cantor and Lessler

[57] ABSTRACT

A process of manufacturing at least a nut of a ball-type feed screw and nut system separately from its fastening element and then joining the nut to its fastening element by a connector so as to produce an assembly designed for the specific requirement of each use of the ball-type feed screw and nut system. The invention is used, in particular, in drive devices for machine tools.

18 Claims, 1 Drawing Figure

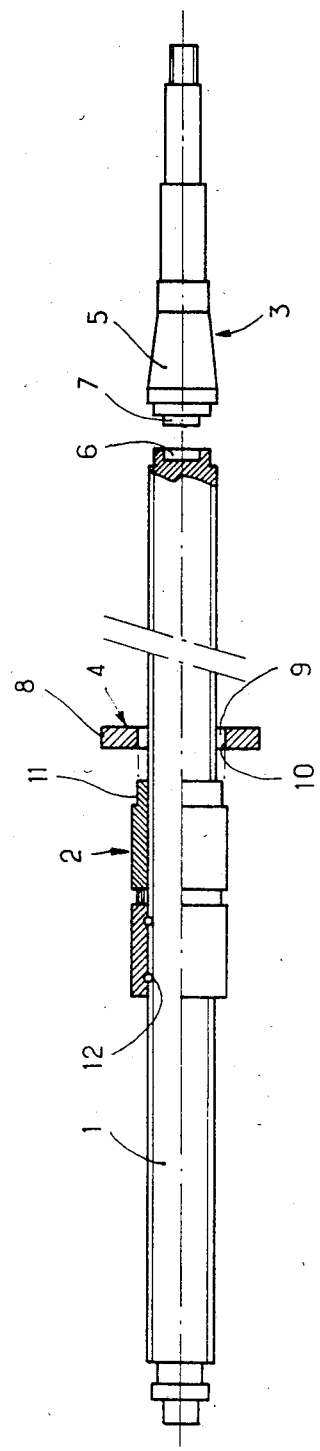

BALL-TYPE SCREW/NUT SYSTEMS AND A PROCESS FOR PRODUCING THEM

The present invention relates to improvements to ball-type feed screw and nut systems and to a process for producing them.

Ball-type screw/nut systems are widely used in machine tools for driving either a workpiece to be machined, the tool then being fixed, or the tool when the workpiece to be machined is fixed, or even for numerous other uses.

In some embodiments, the feed screw incorporates fastening means consisting of at least one fastening connector located at one end of the said screw and, more generally, of two connectors, one of which is mounted fixedly in a bearing integral with the machine frame, whilst the other is connected to a motor driving the screw in rotation, again by means of a bearing.

As regards the nut, it also incorporates fastening means consisting of a collar which has to be made integral with a transversely movable support, for example a carriage.

Hitherto, each assembly of the feed screw or nut system is manufactured and machined in one piece with the fastening means.

Now any application involves specific requirements linked to the machining of the workpiece in question. Thus, it is possible to use feed screws of varying length, nuts provided with collars of varying size, etc.

Consequently, it has now been possible to consider any manufacture or standardisation of the feed screw and nut systems or even the assemblies constituting the screws or nuts because of the large number of possible uses, each of which is highly specific.

As a result of this, the cost of these feed screw and nut systems is relatively high and it is practically impossible to mass-produce them.

The object of the present invention is to overcome the abovementioned disadvantages and to propose a process for producing a ball-type feed screw and nut system which not only can be carried out on an industrial scale, but can also be designed for all the specific requirements of the particular uses of machine tools to which the said system is fitted.

The production process according to the invention involves manufacturing at least the nut separately from its fastening means and then joining the said nut to its fastening means by connection means, so as to produce an assembly which is designed for the specific requirements of each use of the said ball-type feed screw and nut system.

A first advantage of the present invention is that it becomes possible to mass-produce at least one of the assemblies of the system, so as to meet the requirements of users promptly.

In fact, taking the screw as an example, it will be seen that for each machine tool which is to receive the screw it is the latter which usually has to be designed for the particular use required by the machine tool, whilst the fastening connector or connectors which connect the screw to drive means are the same for similar uses. In fact, it is customary for the user often to request different effective lengths of the screw between a few tens of centimeters and several meters.

It was necessary, before, to machine the screw to the suitable length at the same time as its fastening connector or connectors, in order to supply an assembly in one piece.

As a result of the present invention, feed screws are produced and machined in a restricted range of lengths, and the fastening connectors are produced separately. When a request is received from a user, it is then sufficient to select a screw, the length of which is greater than that required, and then cut the said screw to the appropriate length. When this first operation has been carried out, the connection is made between the cut screw and its fastening connector or connectors, since in some cases a single connector is necessary.

The example of the screw also extends to the nut assembly where the body of the nut is produced separately from the fastening collar, to allow the nut to be modified, the said modification often being determined by a careful choice of the collar.

Other advantages will emerge from reading the description of a preferred embodiment of the invention, given by way of non-limiting example, and from the attached drawing in which the single FIGURE is an elevational view, partially in section and exploded, of a ball-type system according to the invention.

A ball-type feed screw and nut system comprises a screw 1, a nut 2, connecting or fastening means 3, 4 and balls 12 running in grooves made in the opposing peripheral faces of the screw and nut. The mode of operation of such a drive system is well known to specialists and therefore will not be described in detail. Likewise, the parts of the machine tool to which the system is fastened will be neither illustrated nor described.

The process according to the invention involves manufacturing at least the screw 1 separately from its connecting or fastening means 3 which consist, in this particular case, of at least one connector 5 and, more generally, of two connectors, one of which is mounted freely in a support bearing and the other is connected by suitable means to a motor device driving the screw 1 in rotation.

Thus, several series of screws can be produced in advance, each series consisting of screws of the same length, the various lengths being between a few tens of centimeters and several meters. If the user requires an effective length of, for example, 60 cm for a particular use, a screw of one meter is cut to suitable dimensions to provide the effective length of 60 cm, after which the ends of the said screw are machined to provide blind recesses or female parts 6 designed to receive the male parts 7 of the fastening connectors 3. The adjusted interlocking of the female and male parts 6, 7 is reinforced by laser welding of the said parts 6 and 7, in such a way that the assembly consisting of the screw 1 and the fastening connector 3 forms a uniform assembly of the same strength and/or characteristics as if the said assembly has been produced in one piece.

It should be noted, moreover, that the mass-production of connectors 3 designed for each machine-tool manufacturer results in savings in terms of machining time, a reduction in delivery periods and easy handling.

The same procedure is adopted for the nuts 2 which are manufactured separately from their connecting or fastening means consisting of collars 8. The latter each have a central orifice 9, the edge 10 of which must fit correctly over an annular shoulder 11 provided at one end of the nut 2.

The collar 8 is joined to the nut 2 by means of a laser weld.

The basic nut 2 can be machined in advance based on demand records, thus resulting in a reduction in production and maintenance times, the nut assembly being modified by means of the collar.

Of course, the invention is in no way limited to the exemplary embodiment described and illustrated, but is capable of incorporating many alternate forms accessible to a person skilled in the art, depending on the intended uses, and without thereby departing from the scope of the invention.

I claim:

1. A method for producing a ball-type feed screw and nut system which comprises:
    (A) a first assembly comprising a feed screw and means at one end thereof to fasten the same to drive means; and
    (B) a second assembly comprising a nut which cooperates with said screw to move longitudinally thereon when said screw is turned, and means thereon to fasten a device to be moved to said nut;
said method comprising separately manufacturing said screw and said first-mentioned fastening means and then joining the screw to its fastening means by connection means, to thereby produce an assembly which is custom designed for a specific requirement of each use of said ball-type feed screw and nut system.

2. A ball-type drive screw and nut system obtained by the method of claim 1, wherein the means of fastening the screw are attached to the said screw.

3. A system as claimed in claim 2, wherein the connection means consist, in particular, of a laser weld.

4. A ball-type drive screw and nut system as claimed in claim 3, wherein said first-mentioned fastening means comprises a connector member having one end adapted to mate with said one end of said screw, said connector member being welded to said end of said screw.

5. A method as claimed in claim 1, wherein the screw is manufactured and machined to a dimension and is then cut to the appropriate length as a function of the specific requirements of each use.

6. A ball-type drive screw and nut system obtained by the method of claim 5, wherein the first-mentioned fastening means is attached to the said screw.

7. A system as claimed in claim 6, wherein the connection means consist, in particular, of a laser weld.

8. A method as claimed in claim 1, further comprising separately manufacturing said nut and its fastening means.

9. A method as claimed in claim 8, wherein the screw is manufactured and machined to a dimension and is then cut to the appropriate length as a function of the specific requirements of each use.

10. A ball-type drive screw and nut system obtained by the method of claim 9, wherein the first-mentioned fastening means is attached to the said screw.

11. A system as claimed in claim 10, wherein the connection means consist, in particular, of a laser weld.

12. A ball-type drive screw and nut system obtained by the method of claim 8, wherein the first-mentioned fastening means is attached to the said screw.

13. A system as claimed in claim 12, wherein the connection means consist, in particular, of a laser weld.

14. A method as claimed in claim 1, wherein said joining step is laser welding.

15. A ball-type drive screw and nut system obtained by the method of claim 14, wherein the first-mentioned fastening means is attached to the said screw.

16. A ball-type drive screw and nut system as claimed in claim 15, wherein said first-mentioned fastening means comprises a connector member having one end adapted to mate with said one end of said screw, said connector member being welded to said end of said screw.

17. A method as claimed in claim 14, wherein said joining step is electron beam welding.

18. A ball-type drive screw and nut system obtained by the method of claim 17, wherein the first-mentioned fastening means is attached to the said screw.

* * * * *